United States Patent [19]

Cramsie et al.

[11] Patent Number: 5,448,726

[45] Date of Patent: Sep. 5, 1995

[54] DATA BASE MANAGEMENT SYSTEM WITH DATA DICTIONARY CACHE INCLUDING A SINGLE LOADABLE OBJECT DESCRIPTOR

[75] Inventors: William J. Cramsie, Boca Raton, Fla.; Arthur B. Goldschmidt, Poughkeepsie; Vance E. Pinchbeck, Red Hook, both of N.Y.; Daniel R. Ziegler, Boca Raton, Fla.

[73] Assignee: International Business Machines Corporation, Armonk, N.Y.

[21] Appl. No.: 425,783

[22] Filed: Oct. 23, 1989

[51] Int. Cl.⁶ .............................................. G06F 17/30
[52] U.S. Cl. .................................... 395/600; 395/445; 395/440; 364/DIG. 1; 364/243; 364/243.2; 364/243.4; 364/243.41; 364/282.1
[58] Field of Search ... 364/200 MS File, 900 MS File; 395/600, 700, 425

[56] References Cited

U.S. PATENT DOCUMENTS

| | | | |
|---|---|---|---|
| 4,774,661 | 9/1988 | Kumpati | 395/600 |
| 4,791,561 | 12/1988 | Huber | 395/600 |
| 4,805,099 | 2/1989 | Huber | 395/600 |
| 4,819,160 | 4/1989 | Tanka et al. | 395/600 |
| 4,893,232 | 1/1990 | Shimaoka et al. | 395/600 |
| 4,979,109 | 12/1990 | Tanaka et al. | 395/600 |
| 5,133,068 | 7/1992 | Crus et al. | 395/600 |
| 5,136,707 | 8/1992 | Block et al. | 395/600 |

OTHER PUBLICATIONS

Gray, Jim, "Notes on Database Operating Systems," *Operating Systems—An Advanced Course*, Ed. Bayer, R., et al., 1977, pp. 394–481.

Neuhold, Erich J., et al., "An Interactive Query and Definition Facility for Semantic Dictionaries," *Entity-Relationship Approach, Information Modeling and Analysis*, P. P. Chen (ed.), ER Institute 1981, pp. 433–457.

Mark, Leo, et al., "Metadata Management," *Computer*, December 1986, pp. 26–36.

*Primary Examiner*—Paul V. Kulik
*Attorney, Agent, or Firm*—William A. Kinnaman

[57] ABSTRACT

In a data base system management system having a dictionary for maintaining a list of sets of data associated with each of a plurality of user application programs, a method and apparatus for decreasing the data base access time by forming a data model of the logical relationship of said list, generating static access modules, creating a secondary data model in a pre-built machine executable format and storing the data model. In the execution stage accessing the secondary data model and manipulating data values using the secondary data model.

15 Claims, 10 Drawing Sheets

COURSE 61

| COURSE# | TITLE | DESCRIPTION |
|---|---|---|
| M23 | DYNAMICS | ... |

PREREQ 62

| COURSE# | TITLE |
|---|---|
| M19 | CALCULAS |
| M16 | TRIGONOMETRY |

OFFERING 63

| DATE | LOCATION | FORMAT |
|---|---|---|
| 750106 | OSLO | F2 |
| 741104 | MADRID | F3 |
| 730813 | DUBLIN | F3 |

TEACHER 64

| EMPLOYEE# | NAME |
|---|---|
| 421633 | SHARP, R. |

STUDENT 65

| EMP# | NAME | GRADE |
|---|---|---|
| 761620 | TALLIS, T. | B |
| 183009 | GIBBONS, O. | A |
| 102141 | BYRD, W. | B |

FIG.4

DATA BASE MANAGEMENT SYSTEM WITH DATA DICTIONARY CACHE INCLUDING A SINGLE LOADABLE OBJECT DESCRIPTOR

This invention relates to data base management systems and which particularly to data base management systems which that have an active data dictionary that the user can both access and modify and more particularly to a system with a separate data dictionary cache describing all characteristics of a data model.

BACKGROUND OF THE INVENTION

In the earliest computer systems the computers maintained an independent file or data base for the exclusive use of each program which ran on the computer. Since other applications programs could use some of the same data bases it was found that there was a significant amount of duplication and data redundancy and that for efficient use the data is placed in a common data base representing the collection of all interrelated data to serve a number of application programs. The data is stored in the data base in an order or arrangement which is independent of the ordering of the data in the application programs.

The computer would then have a data base management system which is a set of program instructions to manage this data and to function as an interface between the application programs and the data. This data base management interface function is provided by a mapping or data modelling structure for the data base sometimes referred to as a schema. This structure indicates which elements of the data base are required for use in a particular application program. Each application program accesses the common data base through this mapping or data model and permits access only to the data required for operation of a particular application program.

The data base management system has its own architecture which relates to the physical structure and organization of the memory device which are controlled by the data base management system. The architecture further defines the relation and interconnection of the files, records, record segments, and mapping data models or schemas within the common data base. This architecture is defined at the time the data base is created and is reflected in a data dictionary.

The data dictionary is a software structure that contains a list of all the application program data bases contained in the common data base and their associated mapping or data models or schemas. The data dictionary also contains a definition of each map or data model and the various types of data elements which are stored in the memory along with security information.

Until recently the data dictionaries were static. These static dictionaries cannot be changed except by the data base administrator who must recompile the data base system and the data dictionary with each change that is made to the elements. In this type of arrangement, the computer system user has no ability to change this architecture except through the data base administrator. The data base management system also stores the data in a form and format dictated by the data base management system architecture. The data can be accessed under this system only by requesting the data in a manner which is consistent with this form and format.

Recently the limitations of a static data dictionary have been overcome by adding active data dictionary to the basic data base management system. An example of an active data dictionary is described in U.S. Pat. No. 4,774,661 of Kumpati entitled "Data Base Management System with Active Data Dictionary". This patent is incorporated herein by reference. This type of data base management system provides the user with a model of the data dictionary, which data model is architecturally consistent with the model of the data stored in the data base. The data dictionary itself contains data which defines various maps or models (schema) and application program data bases and this data dictionary can be modified as can the data contained in the common data base. The data dictionary is not only part of the data base management system but is also a data base of itself.

In a data dictionary, the data elements are normalized for optimal data usage. In normalizing, the data directory contains all of the definitions of the data and eliminates duplicates. Further, there is a grouping the data elements in the best grouping in their most normal and best usable form. The normalization theory is built around the concept of normal forms. A relation is said to be in a particular normal form if it satisfies a certain specified set of constraints. For example, a relation is said to be in first normal form if and only if it satisfies the constraint that it contains atomic values only. To put it another way, at every row-and-column position in a relational table there always exists precisely one value, never a set of values. Through the normalization process dictionary elements tend to span multiple records usually requiring multiple relations if the dictionary is being stored using Structured Query Language (SQL), which is a language used to manipulate the relations.

We can define a relational data base as a data base that is perceived by the user as a collection of time-varying, normalized relations of assorted degrees. (By "time-varying relations" we mean that the extensions of the relations are time-varying). In other words, the term "relational data base" means a data base for which the operators available to the user are ones that operate on relational structures. It does not necessarily mean that the data is stored in the form of physical tables. In traditional terms, a relation resembles a file, a tuple a record (occurrence, not type), and an attribute a field (type, not occurrence). These correspondences are at best approximate, however. To put it another way, relations may be thought of as highly disciplined files—the discipline concerned being one that results in a considerable simplification in the data structures with which the user must deal, and hence in a corresponding simplification in the operators needed to manipulate them. It can be concluded by informally summarizing the major features of relational files that distinguish them from traditional, undisciplined files as:

1) Each "file" contains only one record type.
2) Every record occurrence in a given "file" has the same number of fields.
3) Each record occurrence has a unique identifier.
4) Within a "file," record occurrences either have an unspecified ordering or are ordered according to values contained within those occurrences.

The data is made up of objects, which are made up of entities, relationships, attributes, etc. An object instance consists of one or more component instances and these component instances can be stored in different formats. The individual component instances are stored in a completely relational format. In relational format, all of the component instances are stored separately from each other. In order to retrieve an instance of an object, the system has to retrieve each individual record from the relation that it resides in and build a structure that represents the object structure using the individual component instances. When the user was finished using the object, the entire structure could then be decomposed into individual component instances and stored into the individual relations. This need to perform multiple selects in an execution time environment impedes the performance of the run time.

SUMMARY OF THE INVENTION

An improved data base management system is provided that includes a data dictionary for maintaining a list of sets of data associated with each application program used with a data base, a data model for controlling the generation of the list by defining the logical relationships of the list, and means responsive to change commands for modifying the data model and the data dictionary to correspond and is retrieved in one operation. In accordance with one embodiment of the present invention the necessity of performing multiple selects and consequently execution time delays to build the object structure is overcome by providing a separate storage means or data cache which stores all of the characteristics of the given data model of a given object.

BRIEF DESCRIPTION OF THE DRAWINGS

FIG. 4 illustrates the same sample data base in relational format with data occurrences;

DETAILED DESCRIPTION

Figure 1:
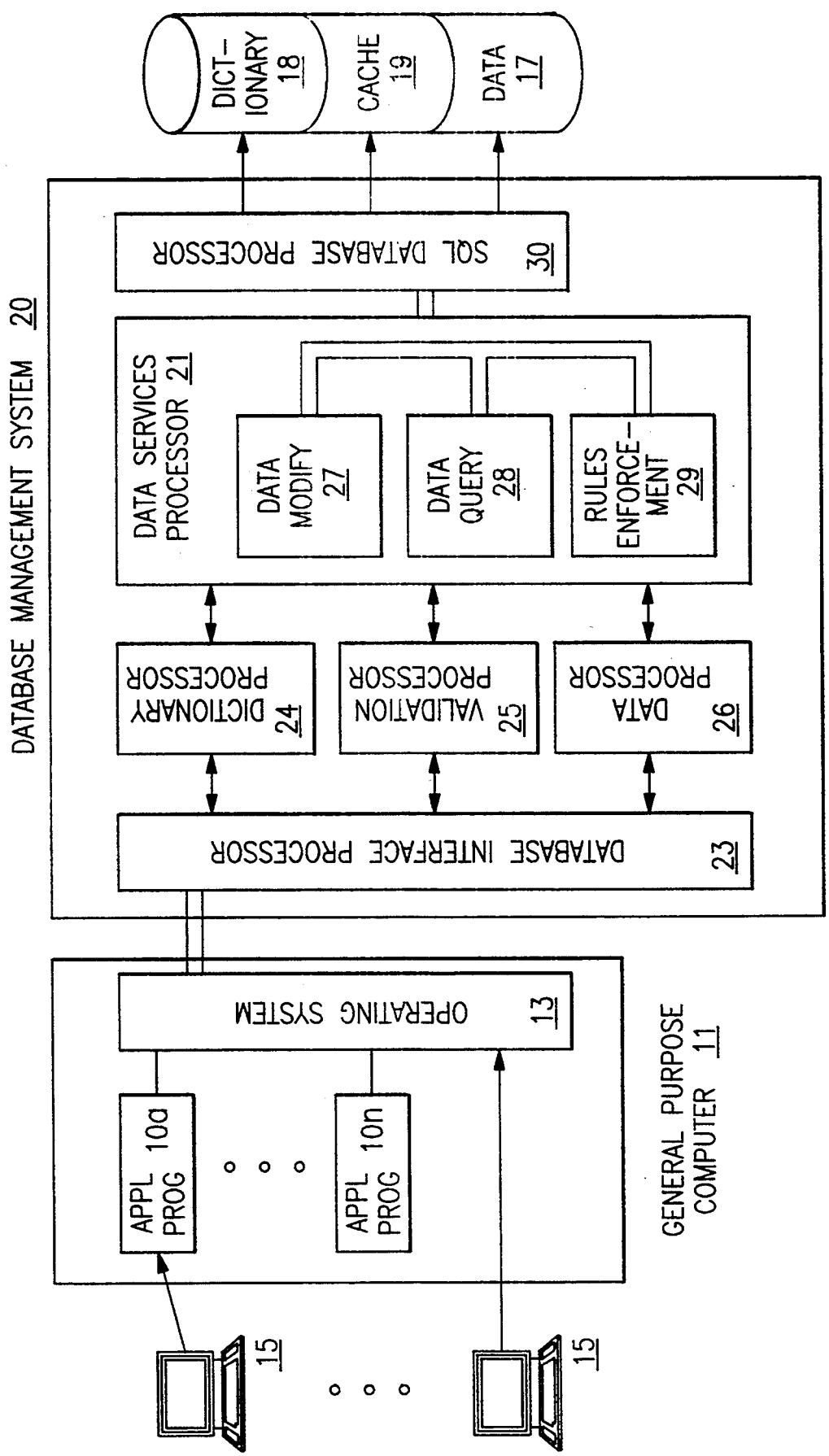
FIG. 1 illustrates in block diagram form the data base management system of the subject invention.

A data base management with the active data directory and the cache is illustrated in block diagram form and FIG. 1. A general purpose computer 11 has an operating system 13 which controls the overall operation of the general purpose computer 11. The user accesses the computer is via the terminal 15. A number of application programs 10a through 10n operate to perform some function by using some facilities of the operating system. A given application program requests data from a data base 17 by transmitting for example, interrupt or data I/O request to the operating system. This request is then forwarded by operating system to the data base management system. The data base management system controls the access to all the data stored in the data base. The data base management system receives all requests from the operating system and decodes these requests. The application program data request is decoded by data base interface processor 23 to ascertain the identity of the requesting application program and the type of request. Processor 23 determines the type and forwards the decoded information to the appropriate processor. Requests to define or modify the data model are forwarded to the dictionary processor 24 which are then forwarded to the data services processor 21. The data services processor 21 then processes the request using its data modify 27, data query 28 and rules enforcement 29 processors. The request is stored in relational tables using the ANSI SQL (Structured Query Language) language. This process allows users from terminals 15 or application programs 10a–10n to build data models that best represent their data structure.

At completion of the data model definition process we introduce an intermediate step prior to creating and modifying occurrences of the data model. This step verifies the correctness of the data model definition, generates static access modules to provide a direct access to the data model and the creation of a secondary data model used during the creation and modification of data occurrences. A module is a compiled program in its executable form. The static access modules are access routines in machine executable form. This intermediate step is initiated by the user from a terminal 15 or by an application program 10a–10n. The request is forwarded from the operating system 13 to the data base interface processor 23. The data base interface processor 23 forwards the request to the validation processor 25 which will use the data services processor 21 to generate static access modules, verify the model accuracy and create a secondary data model hence forth called the cache 19. This cache is a version of the data model in a pre-built machine executable format. When a request is made by the user from a terminal 15 or an application program 10a–10n to modify or query data occurrences represented by the data model, the cache can be loaded into the computer system main memory and used by the data base management system to perform rules enforcement and type checking of data occurrences.

Figure 2:
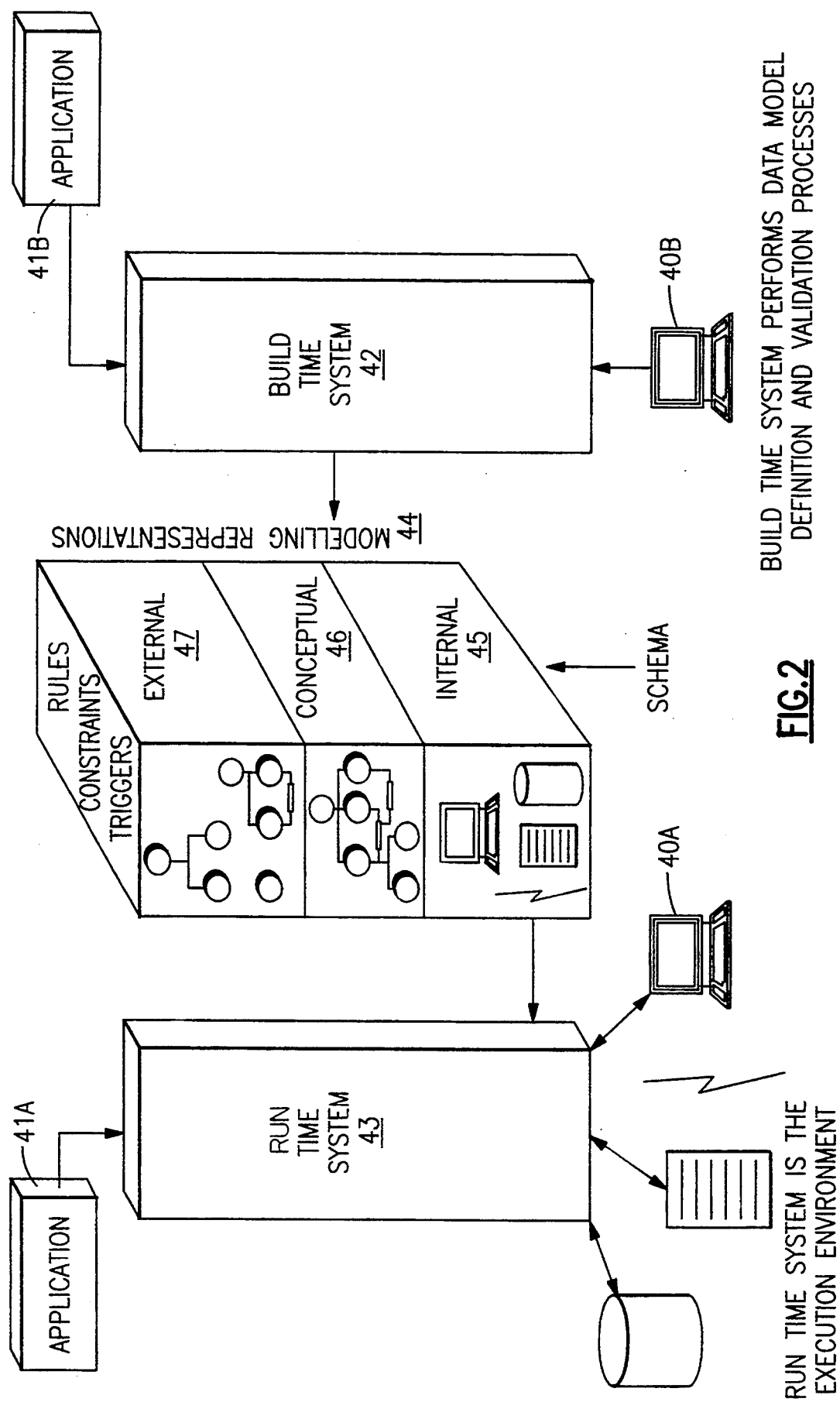
FIG. 2 illustrates a build time system creating data models that are used by the run time system.

FIG. 2 represents the process of building data models using the build time system 42 and accessing occurrences of the data models using the run time system 43. We can compare the build time system 42 to what is known in the art as the data definition language (DDL) and the run time system to what is known in the art as data manipulation language (DML). The user initiates request to the build time system 42 via a terminal 40B or an application program 41B. These requests are used to create the data model or schema 44. This data model represents a user's perspective of the data, how it is stored on the physical disk, referred to as the internal schema 45, how the data model is seen by a group of users or a community view 46, referred to as the conceptual schema and how the data model is represented to the user (as seen from 41A or 40A), referred to as the external schema.

When the user has completed the definition of the data model the build time system 42 allows for the validation process. This process makes the data model available to the run time system 43. The run time system uses the data model created by 42 to insure the accuracy of the data occurrences the user will create, modify or query.

It is well known in the art to provide a data dictionary in any data management system. The data dictionary is simply the repository of information about the definition structure and usage of the data that is stored in the database management system. The data dictionary is essentially the outline of how the system is structured. In order to provide application program independence from data, developments in the art have developed such as the above cited U.S. Pat. No. 4,774,661 which provide a means for a generic application program to directly query the data dictionary to view or change the data item. With this the application programs are independent of the data and they can rely on the information provided through the data dictionary. In the data base management system, data dictionaries may be represented by multiple data records or relations in the relational data base system. In order to provide an active data dictionary the run time system 43 must have the data model available to it to insure data accuracy and to manage relationships between data records or relations. In these data base management systems each time the data model changes, the data base management system has to access the data model. Depending on the size of the data model these accesses may take multiple I/O interrupts to collect the pieces of the data model and load them in main memory of the computer system so it can be used by the run time system. The I/O request and collection process can impede the performance of the data base management system. The validation process described in this invention provides a mechanism to create a main memory version of the data model that will require no more than one I/O interrupt to load the data model into main memory, with no run time overhead for the data model collection process.

Figure 3:
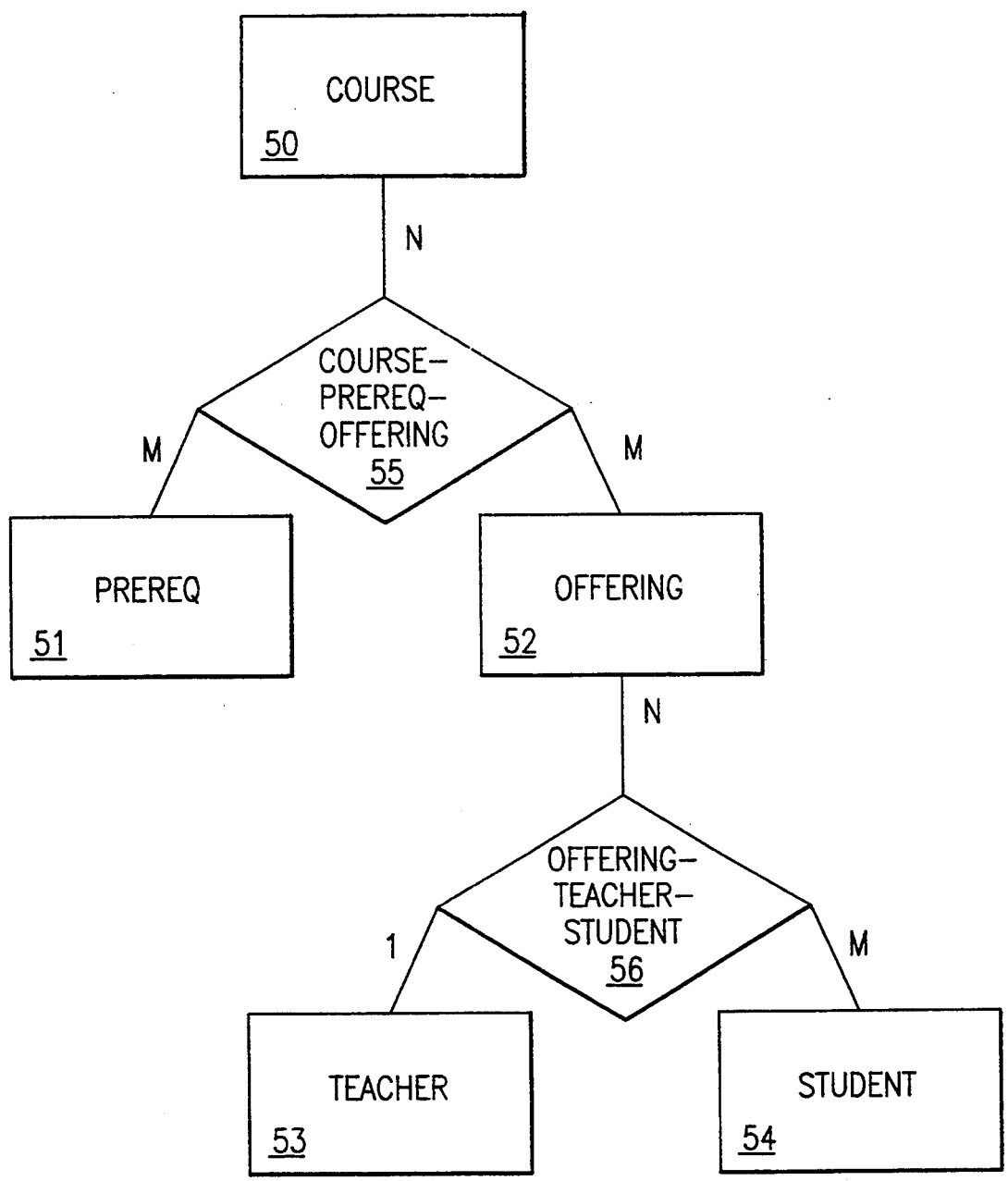
FIG. 3 illustrates a sample data base structure represented in an Entity-relationship diagram.

This can best be represented through an example. FIG. 3 depicts an entity-relationship model of an education data base. As FIG. 3 shows we have five entities: Course, Prereq, Offering, Teacher and Student. Course 50 is the root entity, the other are dependent entities. Each dependent entity has a parent, the parent of Teacher 53 (and Student 54) is Offering 52 for example. Similarly, each parent entity has at least one child entity. Course 50 for example, has two. It is important to understand that for one occurrence of any given entity there may be any number of occurrences of each of its child entity occurrences. In this example we have determined we will use a relational data base product to manage our education data base. FIG. 4 represents the education data base as relations with attributes and data occurrences.

The Course relation 61 contains three attributes: course number, the title of the course and a course description.

The Prereq relation 62 contains two attributes: the course number of the dependent course and its title.

The Offering relation 63 contains three attributes: the date the course if offered, the location of the offering and the course's format (e.g. full time or part time).

The Teacher relation 64 contains two attributes: the teacher's employee number and name.

The Student relation 65 contains two attributes: the student's number and name.

FIG. 4 shows one occurrence of the root entity (Course 61), and hence, by definition one occurrence of the education data base. The complete education data base will contain many Course 61 occurrences, representing information about many courses. In the particular occurrence shown in FIG. 4 we have dependent on the Course 61 occurrence two occurrences of Prereq 62 and three occurrences of Offering 63. The first Offering 63 occurrence in turn has one Teacher 64 occurrence and several Student 65 occurrences dependent on it. The other Offerings 63 have no teachers or students assigned to them yet.

Figure 5A:
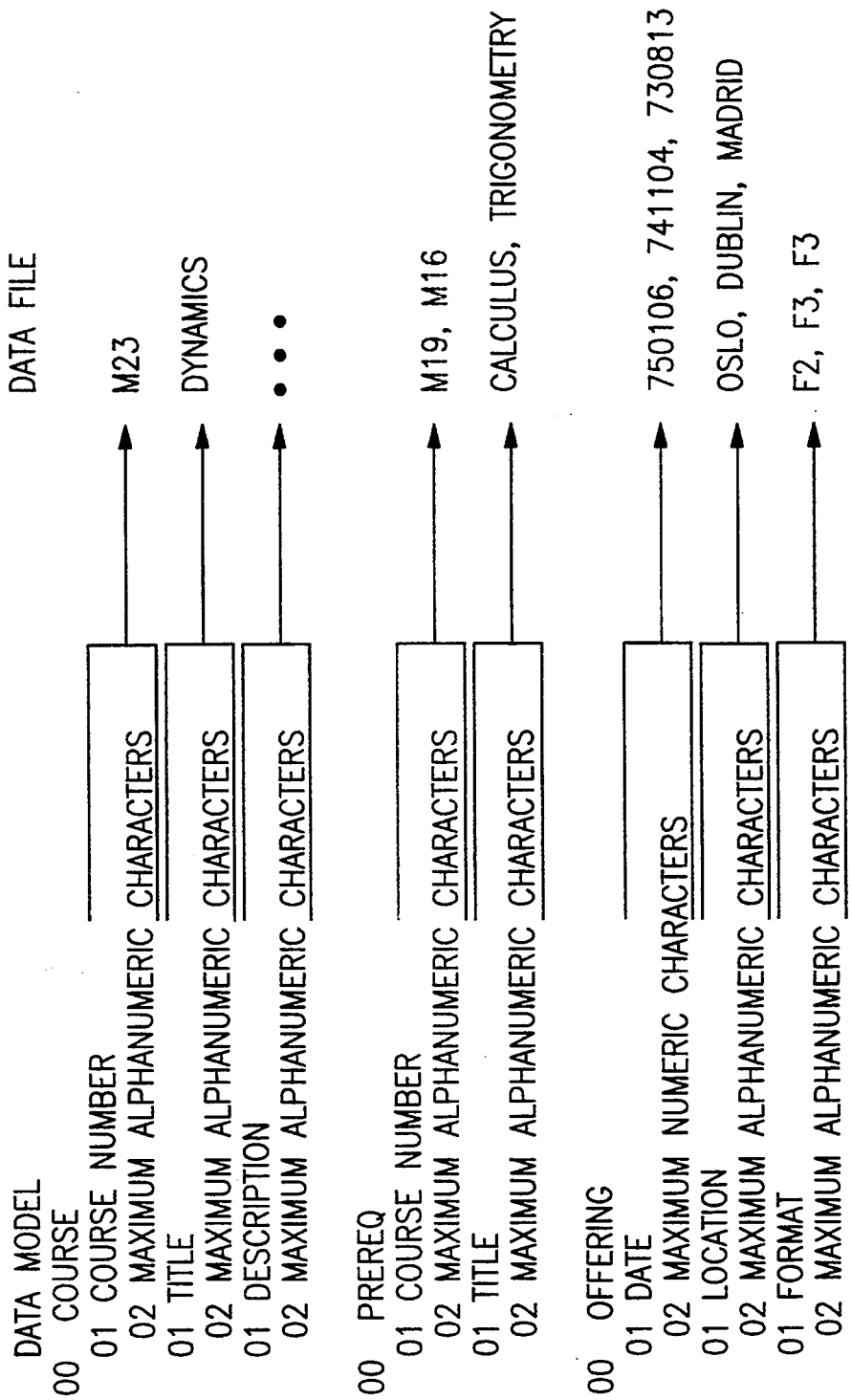
FIGS. 5A and 5B illustrate the sample data model with its characteristics and data occurrences.
Figure 5B:
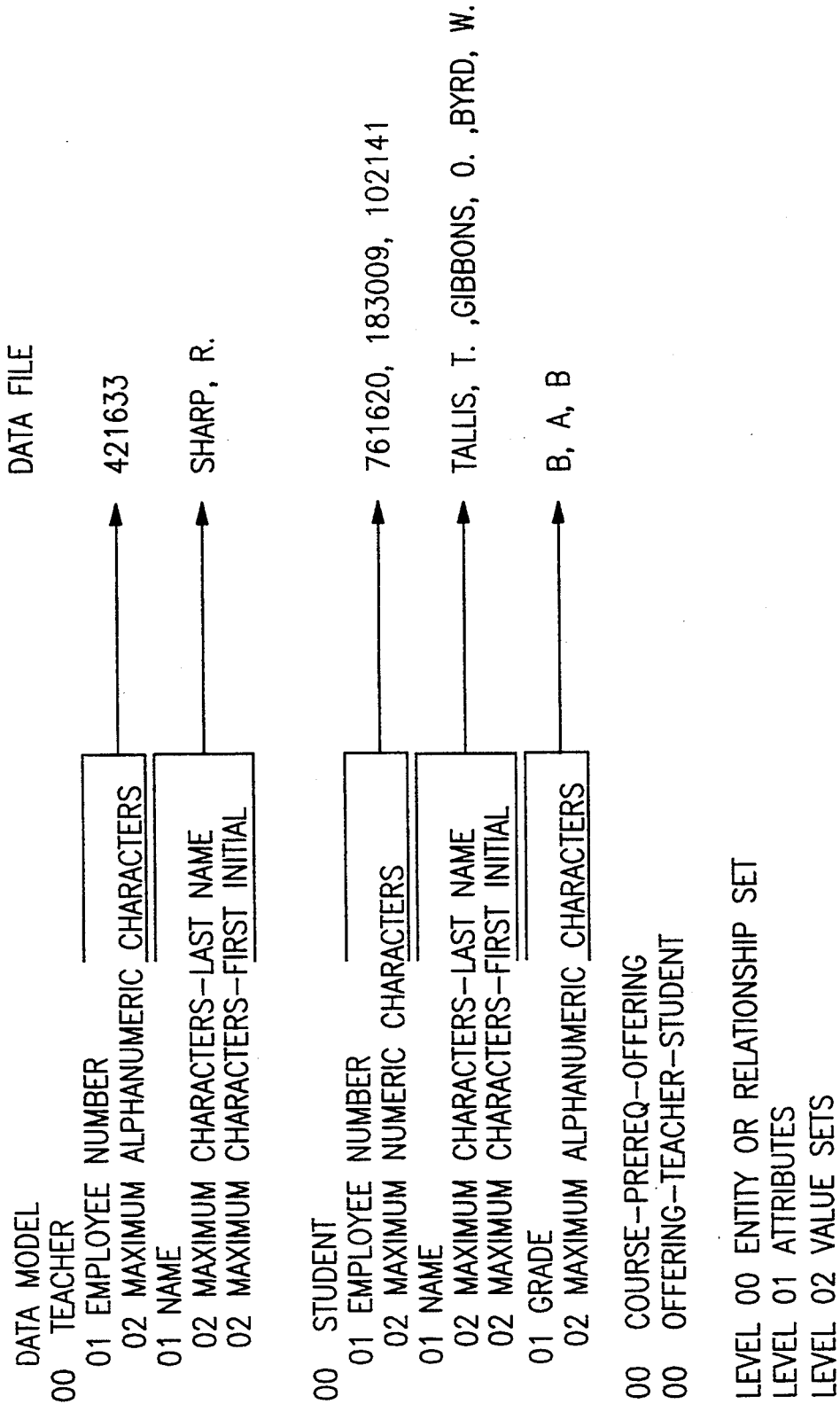

FIGS. 5A and 5B extend our example showing the entity sets and relationships sets with their characteristics. An entity is a thing that can be distinctly identified, e.g., a teacher or a student is an entity that can be identified by name, social security number, etc. An entity set is a group or set of things, e.g., a group or set of students. A relationship is an association between entities. For example, consider two entity sets of course and offering. The association or relationship between course and offering is that an offering represents information about a course. Furthermore, an offering is not limited to representing one course but may indeed represent many courses (one to many). A relationship set is therefore a group or set of associations between entities. It is these different relationships or associations between course(s) and offering(s) that represents a relationship set.

Both entity sets and relationship sets have attributes and value sets. An attribute is a function that maps an entity set or relationship set into one or more value sets. In essence, an attribute identifies (or defines) various characteristics of an entity or a relationship, and a value set further identifies (or defines) the entity by populating these attributes with specific items of data which define those characteristics. Thus, the data model comprises a definition of the various entity sets and relationship sets. The data model contains these data definitions but no actual data. All the data is contained in the value sets or data file.

Consider the entity set course, an attribute of a course is a course number, and a value set for a course number is represented by some number of characters (shown in FIG. 5A as M23). Another attribute of the entity course is the course name, and a value set for course name is represented by some number of characters (shown in FIG. 5A as Dynamics). The third and final attribute of the entity course is description and the value set is represented by some number of characters (shown in FIG. 5A as . . . ). For the entity set prereq an attribute for a prereq is course number represented by some number of characters. A separate data file contains the actual data, i.e., the actual course numbers (shown in FIG. 5A as M19, M16). Course title is another attribute of the entity prereq, the value sets for title are a number of characters. A separate data file contains the actual data (shown in FIG. 5A as Calculus and Trigonometry). FIG. 5A continues to represent other entity sets and values sets of our education data base. Entities are represented by the 00 level, attributes represented by the 01 level, and attribute characteristics represented by the 02 level. The actual data values are represented at the right.

As stated above, the data model contains data definition but no actual data. The actual data is stored in a separate data file.

Figure 6:
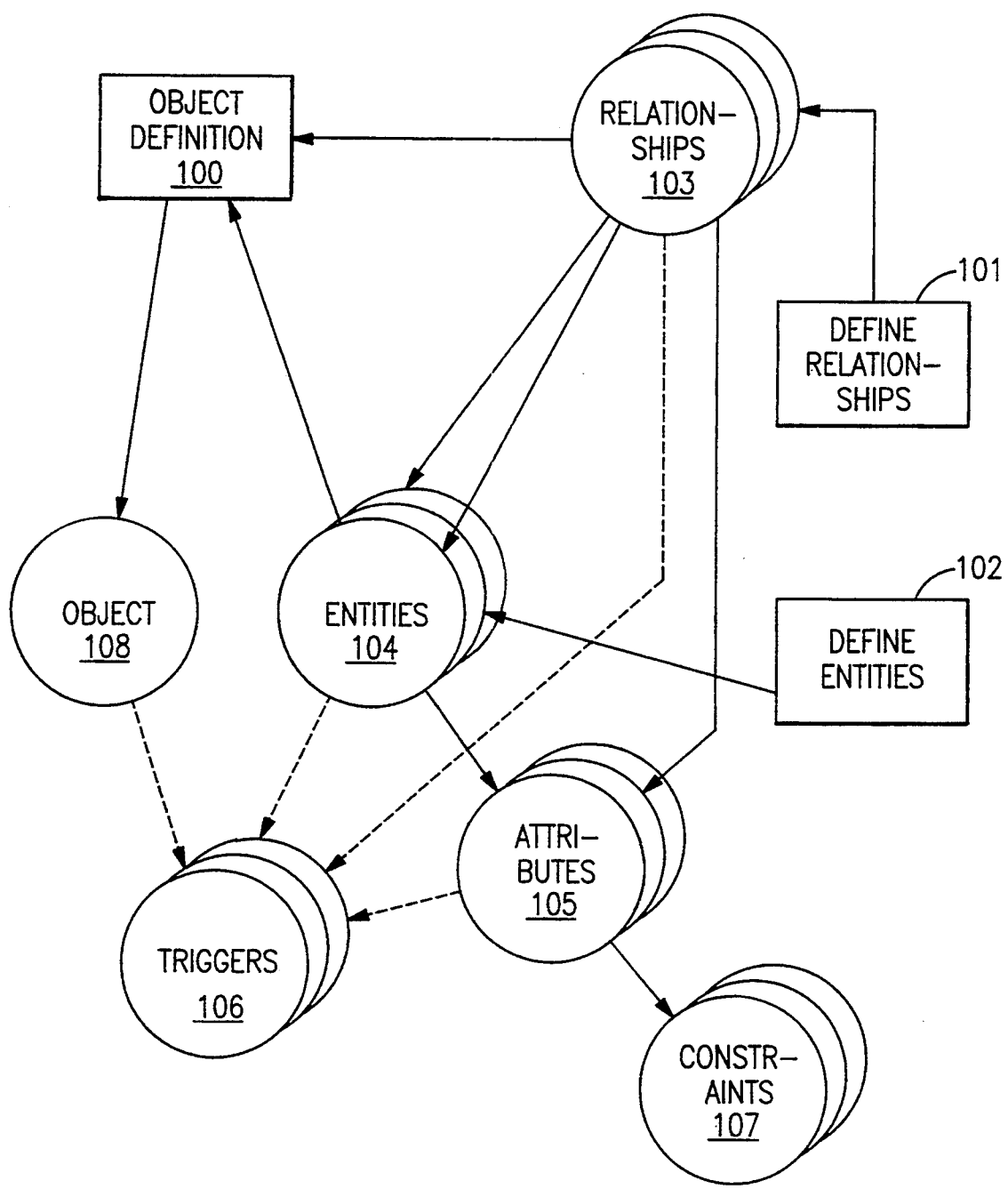
FIG. 6 illustrates the object definition process.

The use of an interactive session is assumed in the following discussion. We introduce another term which we use to express the grouping of entity sets and relationship sets called an object. An object can be distinctly identified and represents a grouping of entity sets and relationships. Objects are defined to the subject data base management system through the build time system. FIG. 6 represents the process of object definition with three basic steps:

1. Object definition 100,
 2. Entity definition 102, and
 3. Relationship definition 101.

The user of the system describes the object by specifying the name of the object 108 and the entity sets 104 and relationship sets 103 that are grouped with the object. The object definition step begins to populate the data dictionary with user's data model information. Once the entity set and relationship set are identified to the system, the user can define the entity sets by further defining the attributes that the entity set contains as well as the characteristics of the attributes. The subject data base management system allows for the definition of constraints 107 and triggers 106. These are rules applied to the data model which will be enforced on the data value sets by the run time system. A constraint is a value set check which insures that the value meets a user defined criteria (e.g. value range is not greater than 100, or a value is numeric data only). If the value set check fails the value will not be added to the data base. Triggers are provided for more complicated value checking mechanisms (e.g. courses may not have more than 35 students). These are added to the data base management system through the use of user-developed programs and applied to the data model to be enforced by the run time system. These rules are context sensitive and may be applied against objects, entities, relationships or attributes. We further define the object by defining the relationships between entity sets, the attributes that are contained within the relationship and any rules that should be applied to the relationship.

In the object definition process we could treat the education data base as a single object with five entity sets: Course, Prereq, Offering, Teacher and Student, and two relationship sets, a Course-Prereq-Offering relationship and a Offering-Teacher-Student relationship. Each of the five entities contain a certain number of attributes described in FIG. 5B and their attribute characteristics. The relationships do not contain any attributes but we would describe the rules of dependence (e.g. there must be at lease one teacher for every offering), and the cardinality of the relationship (e.g. the number of data values allowed in our entity set—many to one, one to many, one to one). There may be many Prereqs for one course, for example, Dynamics prereqs, Calculus and Trigonometry. We could further define any triggers and constraints we wanted to apply to the education object.

The object definition process may span multiple invocation sessions.

We introduce another term, view. A view is a thing that can be distinctly identified and represents a proper subset of an object. At the completion of the object definition process the user may define views of the object. A view is a way of subsetting the object, allowing the user to only see (view) those entities, relationships and attributes that he is concerned with during a particular operation with the run time system.

Figure 7:
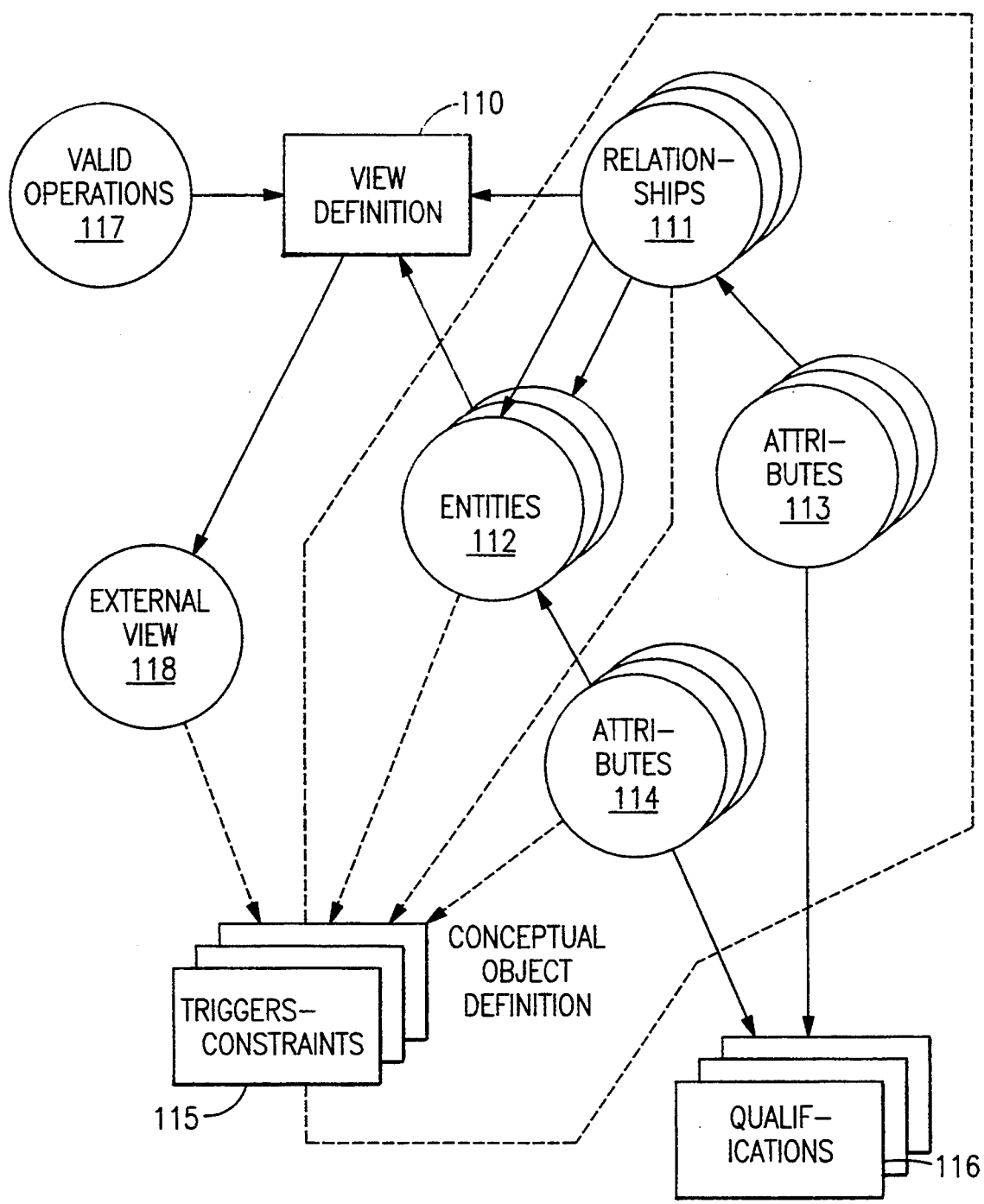
FIG. 7 illustrates the view definition process.

FIG. 7 represents the view definition process which is similar to the object definition process, but rather than creating a new thing the view definition 110 process allows for the identification and subsetting of a previously created object. The user identifies the entity sets 112 and their attributes 114, the relationship sets 111 and their attributes 113, as well as the triggers and constraints 115 that make up the subset of the object. Throughout the view definition process we can provide information that can further subset the view of the object, qualifications 116 and valid operations 117. Qualifying a view allows the user to specify criteria that certain data values must satisfy before they will be considered part of the view, e.g., define the view of the education object for all course offerings in Oslo. In this case only those education object occurrences that are offered in Oslo will be treated as part of the view. Defining valid operations allows for the specification of the functions available with the run time system, e.g., insert an occurrence of the education object or select an occurrence of the education object.

Using our education object we could define a view for a user responsible for generating student report cards. This user could have a view defined which includes the course entity, the offering entity and the student entity, identifying within these entities the specific attributes that are required to generate a student report card, for example, course title, date of offering, student name and grade. We could qualify the view with a criteria that only provides occurrences of this view where a grade exists.

The view definition process populates the data base management system's data dictionary with the view definition providing an external view of the data model.

Prior to using the object or view in the run time system the subject data base management system introduces a step which is the focus area of this invention. We refer to this step as the validation process. This process allows for the verification of the data model's accuracy, the creation of a cached (or encapsulated) data model and the generation of access modules. The generation of static access modules is described in U.S. Pat. No. 4,819,160 of Tonka et al. entitled "Method of Processing Data Access in a Database Management System with a Data Dictionary Directory".

Figure 8:
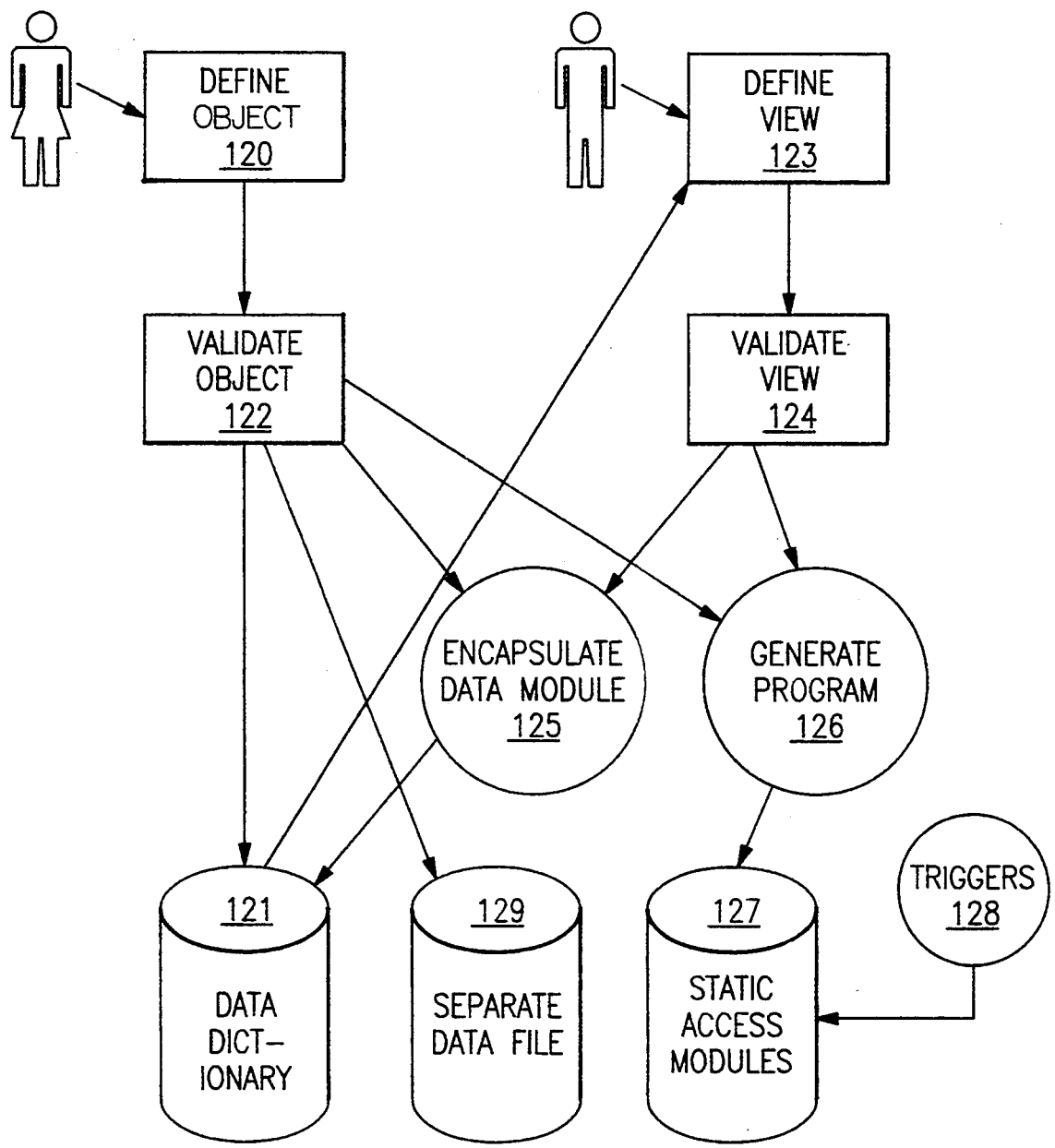
FIG. 8 illustrates the validation process.

FIG. 8 represents the validation process. At the completion of the object definition process 120, the subject data base management system contains a data dictionary populated with the defined data model. The user would request a validation 122 of a specified object, in our example, the education object. The validation process accesses the data dictionary 121 to retrieve the data model of the education object. The next step would insure the accuracy of the data model, i.e., insure all relationships have been defined properly, if an entity requires a relationship to another entity the subject data base management system will insure the entity exists, if the separate data file 129 already exists this process could verify the characteristics of the data model, if the separate data file does not exist it could be created (the subject data base management system provides this as an option of the validation process). Any key values needed to manage relationships (known in the art as primary and foreign keys) would be added as attributes as required to maintain entity relationships. If the verification of the data model completes successfully, the validation process continues by creating a cache (or encapsulation) 125 of the data model storing it with the data dictionary 121 for access by the run time system. The validation process continues by generating 126 access programs 127 to be used by the run time system to access the data values associated with the data model. While the subject data base management system represents the data dictionary 121, the separate data file 129 and the static access programs 127 in separate data disk, these all can be managed by the same data base system. The validation process would complete by associating any user-developed triggers 128 with the access programs 127 for execution by the run time system.

The validation process 124 is requested by the user at the completion of the view definition 123 process. The view is verified against the object definition for accuracy, no separate data file is created in this case. A cache (or encapsulation) 125 of the data model subset is created. Specific access programs 127 are generated 126 for the view with the specified operations and qualifications and the user-developed trigger programs 128 are associated with the access programs.

Figure 9:
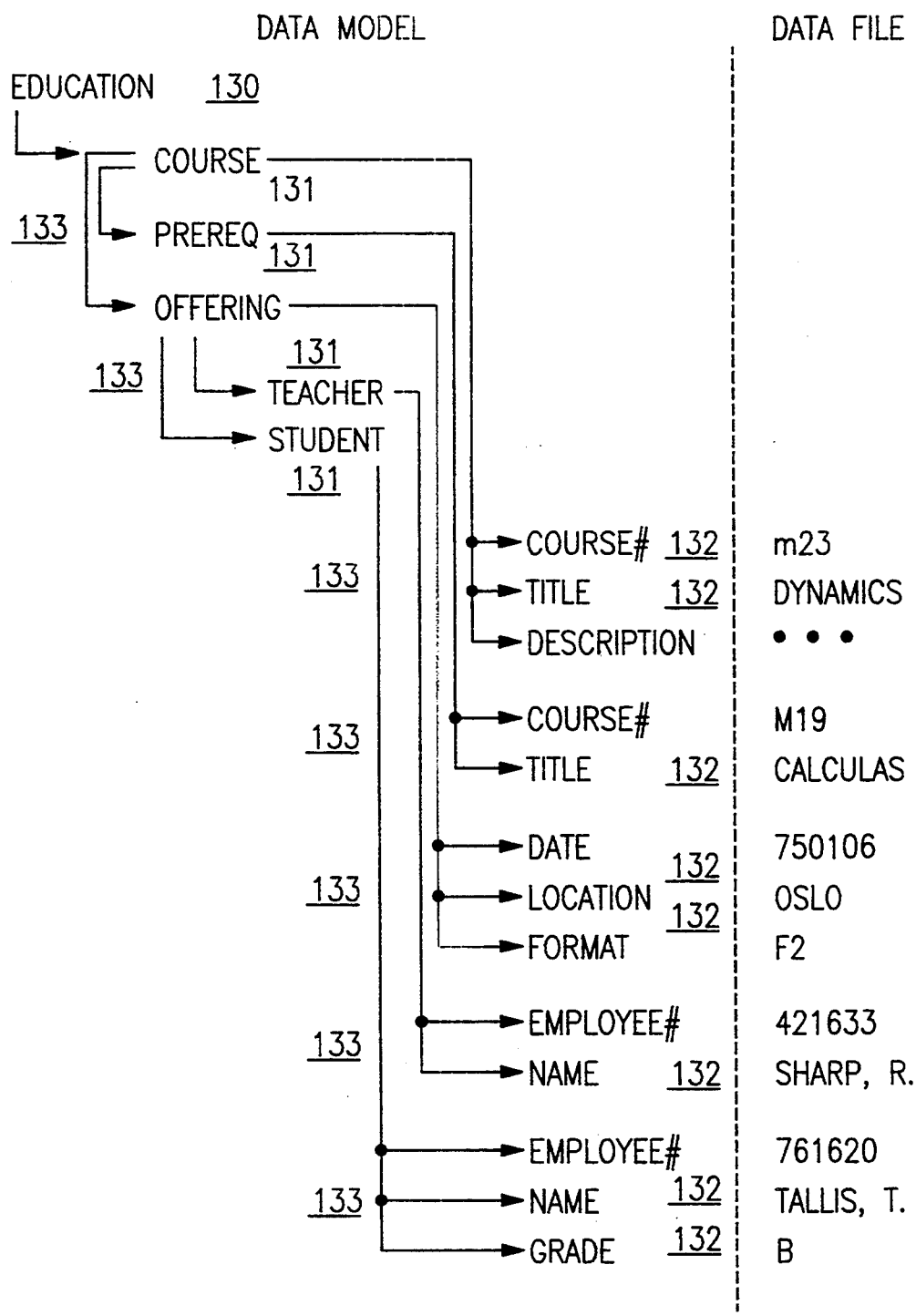
FIG. 9 illustrates the cached data model structure.

If we were to look at our cached data model (shown in FIG. 9) we could see our education object 130, the entity sets 131 and their attributes 132 represented as a memory structure that can be relocated anywhere in main memory. Relationships 133 (shown in the drawing as arrows) would be relative displacements resolved when the model is loaded into main memory. To store the entire object format structure, consisting of all of the entity-relationship instances that comprise a particular object instance, as a Discrete Selectable Object (DSO) illustrated by the sketch as shown in FIG. 9. This second method of storing data is called "data caching". By using data caching the number of individual component instances that are retrieved can be reduced and performance can be enhanced. Once the initial structure is built, either from the relational format or from another input source, the object can be stored and retrieved as a whole. Since we have operations on views of objects rather than the objects themselves we actually store one or more instances of a view of an object in the DSO as a saved cache. This saved cache can then be retrieved as one unit when the user wants to access it.

A significant function available to applications with "cached" data is the ability to allow the system to perform complete data management at the virtual storage level. With a CACHE the system can manage applications data at component level rather then long strings of data.

If you have an object that requires more than one relation it will require that the system perform a retrieve for each relation, i.e. if an object has eight relations, it will require eight SQL selects. If, however, the application uses a cached version of the object, it will never require more than one retrieve for the entire object, no matter how many relations may actually be needed to store the object in its decomposed form. As data value 134 occurrences are requested of the run time system these data values can be brought into main memory and associated with the object set for manipulation.

The data model is data like any other data managed by the subject data base management system and therefore all the services of the run time system are available to manipulate the data model as data values.

Through the normalization process and growth in the data management industry, data models have become quite large, sometimes even stored as separate data management systems. By providing the mechanisms to create a cached data model, no matter how large the data model becomes the data management system can treat the data model as a single record providing optimums performance in accessing the model in a run time (or execution) environment. Where in past data base management systems it may take multiple I/O interrupts to deliver the data model to the run time system, the cache data model can always be retrieved with a single I/O interrupt. Additionally, since the data model is stored as a single collection of bits, it is easily available to communications systems. A cached data model could be sent over a network to a new data base system and the cached model would be used on the new system using the cached data model as input to the validation process. Thus, a company has the ability to populate multiple computers with a single data model without going through the definition process on each computer.

What is claimed is:

1. In a computer system in which one or more data files containing specific instances of data of interest to a user application are accessed using a data model defining said files to the application, said computer system having a main memory and a permanent storage subsystem, a method of accessing said one or more data files comprising the steps of:

generating a data model defining said one or more data files to said application as a single loadable object transferable from said storage subsystem to said main memory in a single data access to said storage subsystem;

caching said data model as a single loadable object in said main memory; and using said data model cached in said main memory to access said one or more data files from said application.

2. The method of claim 1 wherein said one or more data files and said data model are permanently stored in said storage subsystem.

3. The method of claim 2 wherein at least portions of said one or more data files are stored in said main memory.

4. The method of claim 1, comprising the further step of:

validating said data model before caching it in said main memory.

5. The method of claim 1, comprising the further step of storing said data model in said storage subsystem, said step of caching said data model in said main memory comprising the step of transferring said data model from said storage subsystem to said main memory using only a single data access to said storage subsystem.

6. A method for managing data stored in a storage subsystem of a computer system, said computer system having a main memory, said method comprising the steps of:

generating one or more data descriptors defining attributes for said data stored in said storage subsystem;

generating one or more relationship descriptors defining relationships between said one or more data descriptors for one or more application programs;

generating an object descriptor defining the data descriptors and relationships required by at least one of said one or more application programs as a single loadable object transferable from said storage-subsystem to said main memory in a single data access to said storage subsystem;

validating said object descriptor by testing each relationship descriptor and data descriptor referred to by said object descriptor to verify their existence and accuracy; and storing said validated object descriptor including said one or more data descriptors and said one or more relationship descriptors as a single loadable object in said main memory for run time accessing of said stored data by said at least one of said one or more application programs.

7. The method of claim 6 further comprising the step of:

generating access programs for accessing said stored data.

8. The method of claim 6, further comprising the steps of:

generating a plurality of view descriptors describing a subset of said object; and performing said validating step and said storing step for each of said view descriptors.

9. The method of claim 6 wherein said object descriptor defines a system schema.

10. The method of claim 6 wherein said object descriptor defines an end user schema.

11. The method of claim 6 wherein said object descriptor defines end user data.

12. The method of claim 6, comprising the further step of storing said object descriptor in said storage subsystem, said step of storing said object descriptor in said main memory comprising the step of transferring said object descriptor from said storage subsystem to said main memory using only a single data access to said storage subsystem.

13. In a computer system, apparatus for managing data associated with one or more user application programs, said computer system having a main memory and a permanent storage subsystem, said apparatus comprising:

means for generating one or more data descriptors defining attributes of said data;

means for generating one or more relationship descriptors defining each relationship between data defined by said one or more data descriptors;

means for generating an object descriptor defining an object for access by one or more application programs, said object including data defined in one or more of said one or more data descriptors and including relationships defined in one or more of said relationship descriptors, said object descriptor being generated as a single loadable object transferable from said storage subsystem to said main memory in a single data access to said storage subsystem; and means for storing said object descriptor including said one or more data descriptors and said one or more relationship descriptors as a single loadable object in said main memory for run time accessing of said stored data by said at least one of said one or more application programs.

14. The apparatus of claim 13 wherein said data descriptors are normalized to create a set of generalized data descriptors.

15. The apparatus of claim 13, further comprising means for storing said object descriptor in said storage subsystem, said means for storing said object descriptor in said main memory comprising means for transferring said object descriptor from said storage subsystem to said main memory using only a single data access to said storage subsystem.

* * * * *